United States Patent
Lau et al.

(10) Patent No.: US 7,506,080 B2
(45) Date of Patent: Mar. 17, 2009

(54) PARALLEL PROCESSING OF FRAME BASED DATA TRANSFERS

(75) Inventors: Victor Lau, Marlborough, MA (US);
Pak-lung Seto, Shrewsbury, MA (US);
Suresh Chemudupati, Marlborough, MA (US); Naichih Chang, Shrewsbury, MA (US); William Halleck, Lancaster, MA (US)

(73) Assignee: Inter Corporation, Santa Clara, CA (US)

( * ) Notice: Subject to any disclaimer, the term of this patent is extended or adjusted under 35 U.S.C. 154(b) by 321 days.

(21) Appl. No.: 11/229,100

(22) Filed: Sep. 16, 2005

(65) Prior Publication Data

US 2007/0067504 A1    Mar. 22, 2007

(51) Int. Cl.
*G06F 13/28* (2006.01)
*G06F 13/00* (2006.01)
*H04L 12/28* (2006.01)
*H04L 12/56* (2006.01)

(52) U.S. Cl. .......................... 710/22; 710/33; 710/110; 370/395.5; 370/412

(58) Field of Classification Search .................. 710/22, 710/33, 110; 370/395.5, 412
See application file for complete search history.

(56) References Cited

U.S. PATENT DOCUMENTS 7,120,123 B1 * 10/2006 Quigley et al. .............. 370/252
2005/0027900 A1   2/2005 Pettey ........................ 710/22
2005/0060443 A1   3/2005 Rosner ....................... 710/33
2005/0122986 A1   6/2005 Starr et al. .................. 370/412
2005/0149656 A1   7/2005 Seto ........................... 710/105
2005/0149793 A1   7/2005 Beckett et al. .............. 714/724
2006/0007935 A1 * 1/2006 Bennett et al. ........... 370/395.5
2006/0034176 A1 * 2/2006 Lindsay ..................... 370/236
2007/0033301 A1 * 2/2007 Aloni et al. ................. 710/22

* cited by examiner

*Primary Examiner*—Tushar S Shah
(74) *Attorney, Agent, or Firm*—Blakely, Sokoloff, Taylor & Zafman LLP

(57) ABSTRACT

A frame based data transfer device includes a receive frame parser, a receive frame processor, and a DMA engine. The receive frame parser receives a frame, stores framing information from the frame in a receive header queue, and stores an information unit from the frame in an information unit buffer. The receive frame processor is coupled to the receive header queue. The receive frame processor reads a transport layer task context as determined by a tag field in the framing information, determines how to handle the frame from the transport layer task context and framing information, generates a DMA descriptor, and stores an updated transport layer task context. The DMA engine is coupled to the information unit buffer and receive frame processor. The DMA engine reads a DMA task context, transfers the information unit to a destination memory by processing the DMA descriptor, and stores an updated DMA task context.

16 Claims, 3 Drawing Sheets

| Byte | Bit | | | | | | | |
|---|---|---|---|---|---|---|---|---|
| | 7 | 6 | 5 | 4 | 3 | 2 | 1 | 0 |
| 0 | Frame Type | | | | | | | |
| 1-3 | Hashed Destination Address | | | | | | | |
| 4 | Reserved | | | | | | | |
| 5-7 | Hashed Source Address | | | | | | | |
| 8-9 | Reserved | | | | | | | |
| 10 | Reserved | | | | | | ReXmit | Rsvd |
| 11 | Reserved | | | | | | # Fill Bytes | |
| 12-15 | Reserved | | | | | | | |
| 16-17 | Tag | | | | | | | |
| 18-19 | Target Port Transfer Tag | | | | | | | |
| 20-23 | Data Offset | | | | | | | |
| 24-m | Information Unit | | | | | | | |
| | Fill Bytes (if needed) | | | | | | | |
| (n-3)-n | Cyclic Redundancy Check (CRC) | | | | | | | |

FIG. 3

| Code | Name of Frame | Information Unit (IU) | Originator | IU Size (bytes) |
|---|---|---|---|---|
| 01h | DATA | Data | Initiator or Target | 1-1024 |
| 05h | XFER_RDY | Data Xfer Ready | Target | 12 |
| 06h | COMMAND | Command | Initiator | 28-284 |
| 07h | RESPONSE | Response | Target | 24-1024 |
| 16h | TASK | Task Mgmt. Function | Initiator | 28 |

FIG. 4

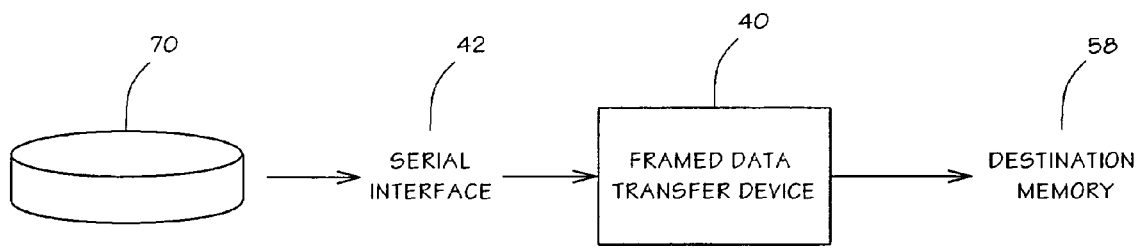

FIG. 5

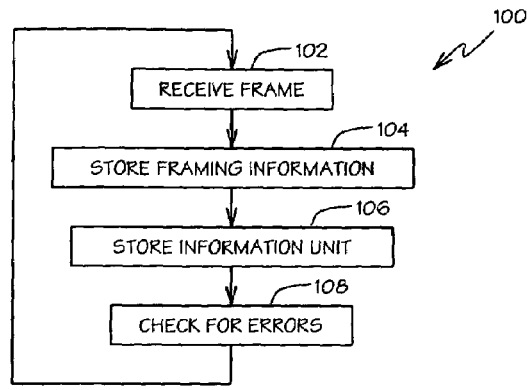
FIG. 6A
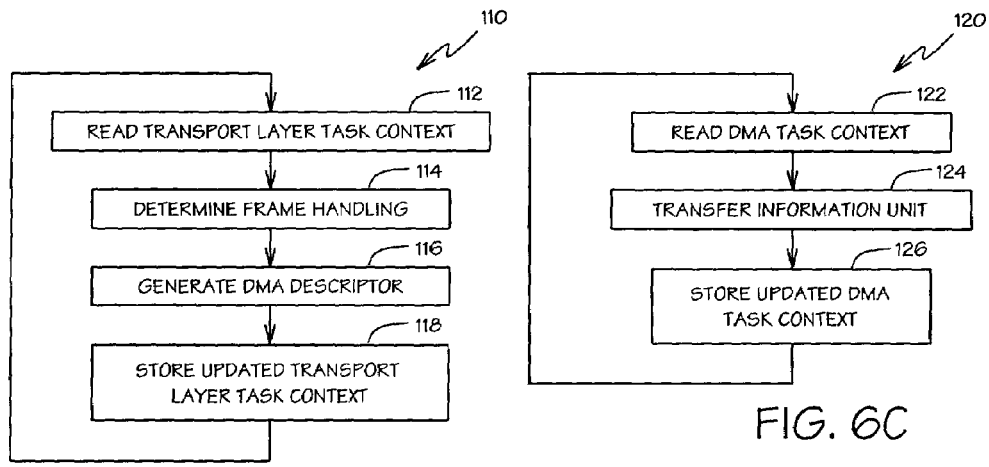
FIG. 6B
FIG. 6C
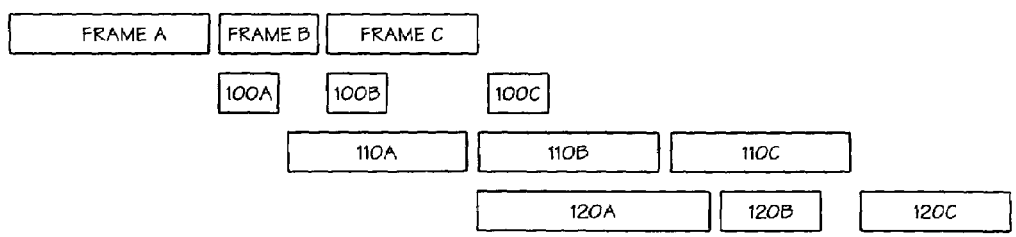
FIG. 7

PARALLEL PROCESSING OF FRAME BASED DATA TRANSFERS

BACKGROUND OF THE INVENTION

Frames or packets of information may be used to communicate with a storage device—such as a SAS (Serial Attached SCSI (Small Computer System Interface)) HBA (Host Bus Adapter) (Information technology-Serial Attached SCSI (SAS), American National Standards Institute (ANSI) International Committee for Information Technology Standards (INCITS) 376-2003), FC (Fiber Channel) HBA (Fibre Channel Framing and Signaling Interface, ANSI/INCITS 373:2003), iSCSI (Internet Small Computer Systems Interface) HBA (Internet Engineering Task Force Request for Comment 3720), etc.—or other devices that transfer data. Frames received from a device may be handled by firmware or hardware in a serial fashion. In order to maintain the line rate, the frame processing time has to be less than or equal to the frame receive time. As input/output (I/O) link speeds increase, the time available process a frame received on the link is decreased.

The frames of information may vary in size. Each frame may include an information unit and framing information that provides information about the frame and the information unit it contains.

A transport layer may be responsible for processing the frames received or transmitted by a device such as an HBA. The transport layer may include a receive frame processor to receive frames, determine the frame type, verify that the frame is valid, and cause the frame to be processed appropriately.

If the receive frame processor receives several frames with relatively small information units it is likely that the receive frame processor will require more time to process these frames than the transmit time provides. This may require that the data link be stalled to lower the effective transmission speed of the data link.

BRIEF DESCRIPTION OF THE DRAWINGS

FIG. 3 is a table showing an exemplary frame of data that may be transferred using an embodiment of the invention.

FIG. 4 is a table showing an exemplary types of framed data that may be transferred using an embodiment of the invention.

FIG. 5 is a block diagram of another frame based data transfer system that embodies the invention.

FIGS. 6A-6C are flowcharts for a method of transferring framed data from a link layer interface that embodies the invention.

FIG. 7 is a chart that illustrates an exemplary timing of data transfers using an embodiment of the invention.

DETAILED DESCRIPTION OF THE INVENTION

Figure 1:
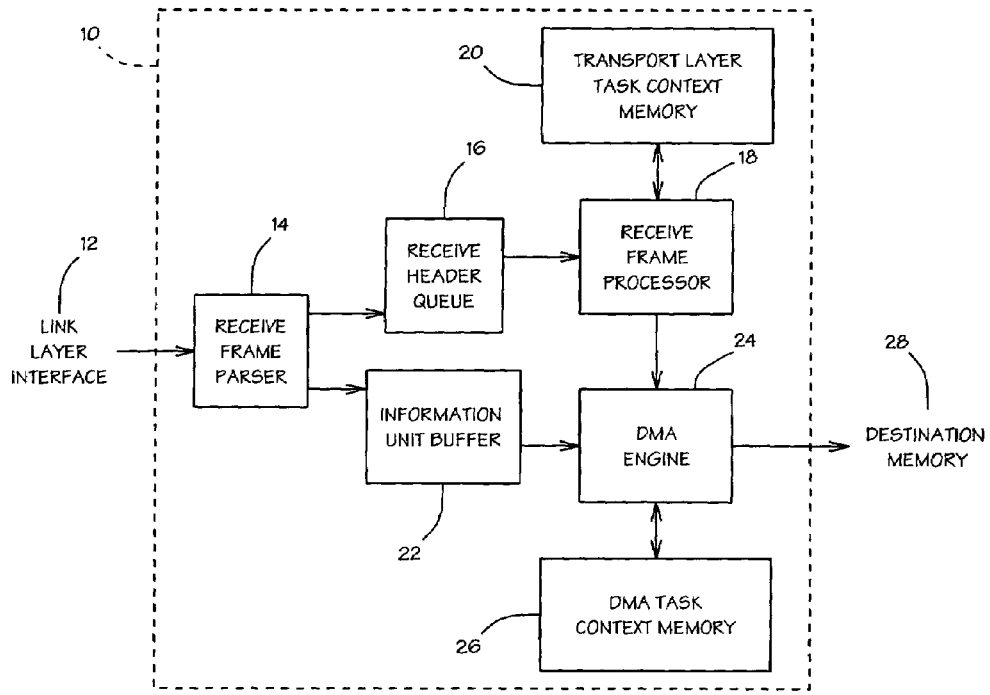
FIG. 1 is a block diagram of a frame based data transfer device that embodies the invention.

FIG. 1 shows a frame based data transfer device 10 that embodies the invention. The frame based data transfer device 10 includes a receive frame parser 14, a receive frame processor 18, and a Direct Memory Access (DMA) engine 24. The receive frame parser 14 receives a frame from a link layer interface 12, stores framing information from the frame in a receive header queue 16, and stores an information unit from the frame in an information unit buffer 22. The receive frame parser 14 may check for errors in the frame before the frame is made available for further processing.

Framed based data transfer may occur over a serial connection, such as a Serial Attached SCSI (SAS) interface, that may be defined in terms of a hierarchy of functions or 'protocol layers'. For example, the SAS architecture includes, from upper to lower layers, an Application layer, a Transport layer, a Port layer, a Link layer, a Phy layer, and a Physical layer. The Physical layer defines the electrical characteristics of the serial connection. The Phy layer defines the encoding and signaling that provides the interface between the Physical layer and the Link layer. The SAS Link layer defines primitives, address frames, and connections. The Link layer manages connections and transmits frames between the Port layer and the Phy layer. The Port layer oversees the operations of the lower layers such as directing the opening and closing of connections and choosing the phy on which to send each frame. The Port layer is the interface between the lower layers already described and the upper layers including the Transport layer and the Application layer. The receive frame parser 14, receive frame processor 18, and DMA engine 24 shown in the embodiment of FIG. 1 may reside in the Transport layer which typically performs frame processing.

The frames of information may vary in size. Each frame may include an information unit and framing information that provides information about the frame and the information unit it contains. FIG. 3 shows an exemplary frame of information used in the SAS protocol. FIG. 4 shows exemplary frame types that may be used in the SAS protocol. It will be noted that the exemplary frames may contain a variably sized information unit and a fixed amount of overhead information. For example, as indicated in FIG. 4, an exemplary DATA frame's information unit may have from 1 to 1024 bytes of data. Some of the exemplary data frames, such as XFER_RDY and TASK, have a small, fixed sized and a fixed amount of overhead information. Received frames must be processed very quickly to avoid a need to stall delivery of frames when a number of frames with small information units are received in succession. A DATA frame with a 1024 byte information unit (IU) and 28 bytes of framing information will take 3.5 microseconds (us) to transmit on a data link at a rate of 3 gigabits/second (Gb/s). If the IU is 4 bytes, it will take 133 picoseconds (ps) to transmit the frame. In both cases, 28 bytes of overhead information needs to be processed by the receive frame processor.

The term "context" is used to describe the state of an entire I/O data transfer which includes one or more data frames and control frames to execute an I/O data transfer. The context maintains the state of each I/O data transfer so that it may be processed coherently even though the processing may be interleaved with the processing of other unrelated I/O data transfers. The context may include fields such as the following:

I/O transfer type—Read or Write (Inbound or Outbound), for other I/O transfer types, the context fields are defined different from fields describes below I/O transfer length—which may include many data frames/packets Source Device Address (e.g. SAS Address, Fibre Channel Address)

Destination Device Address

Source I/O Tag

Destination I/O Tag

Control Flags

Data/Buffer Scatter Gather List (SGL)

Protocol Type such as SCSI, Serial Advanced Technology Attachment (SATA), etc.

In order to support parallel processing, or pipelining, of received frames without resource conflict in the context, the context must be divided into two or more sections, such as a transport layer task context and a DMA task context. Thus, different tasks can access their respective portions of the contexts at the same time.

The receive frame processor 18 is coupled to the receive header queue 16. The receive frame processor 18 reads a transport layer task context as determined by a tag field in the framing information, determines how to handle the frame from the transport layer task context and the framing information, generates a DMA descriptor, and stores an updated transport layer task context. The DMA descriptor provides the information required by the DMA engine to transfer data included in the frame.

The DMA engine 24 is coupled to the information unit buffer 22 and the receive frame processor 18. The DMA engine 24 reads a DMA task context, transfers the information unit to a destination memory 28 by processing the DMA descriptor, and stores an updated DMA task context.

The receive frame processor 18 and the DMA engine 24 are able to operate in parallel because the transport layer task context required for the operations performed by the receive frame processor and the DMA task context required for the operations performed by the DMA engine are stored independently of one another. A transport layer task context memory 20 may be coupled to the receive frame processor 18 to store the transport layer task context. A DMA task context memory 26 may be coupled to the DMA engine 24 to store the DMA task context. The transport layer task context memory 20 may be for the exclusive use of the receive frame processor 18. The DMA task context memory 26 may be for the exclusive use of the DMA engine 24. The transport layer task context memory 20 and the DMA task context memory 26 may be arranged to permit concurrent access.

Figure 2:
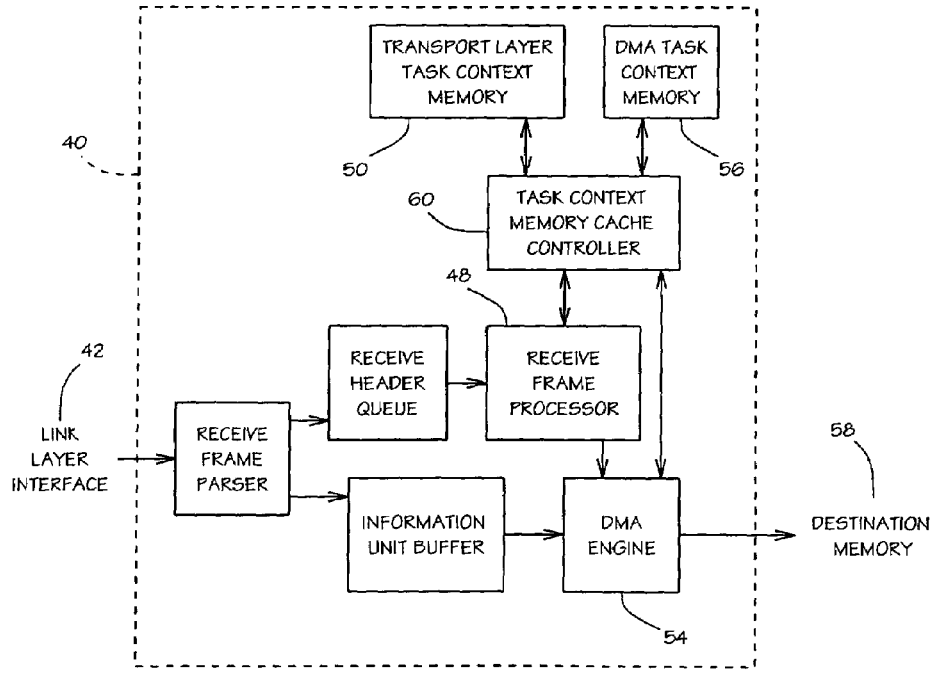
FIG. 2 is a block diagram of another frame based data transfer device that embodies the invention.

FIG. 2 shows another frame based data transfer device 40 that embodies the invention. In this embodiment a task context cache controller 60 is coupled to the receive frame processor 48, the transport layer task context memory 50, the DMA engine 54, and the DMA task context memory 56. The task context cache controller 60 may receive and process in parallel requests for the transport layer task context memory 50 and the DMA task context memory 56 from the receive frame processor 48 and the DMA engine 54.

FIG. 5 shows a frame based data transfer system that embodies the invention. A disk drive 70 that uses frame based data transfer, such as a serial attached small computer systems interface (SAS) disk drive, is coupled to a frame based data transfer device 40, such as the devices of FIG. 1 or 2, by a serial interface 42. The frame based data transfer device 40 receives data frames that may include data for a destination memory 58. The frame based data transfer device 40 processes the frames as described above to separate and transfer the data for the destination memory 58.

FIGS. 6A-6C are flowcharts for a method of transferring framed data from a link layer interface that embodies the invention. FIG. 6A is a flowchart for performing a frame parsing task 100. The frame parsing task includes receiving a frame from the link layer interface 102, storing framing information from the frame in a receive header queue 104, and storing an information unit from the frame in an information unit buffer. The frame parsing task 100 may further include checking for errors in the frame 108. It will be appreciated that the operations of the frame parsing task 100 may be performed in other orders in addition to one illustrated. One or more of the operations of the frame parsing task 100 may be performed in parallel rather than sequentially as shown.

FIG. 6B is a flowchart for performing a transport layer task 110. The transport layer task includes reading a transport layer task context as determined by a tag field in the framing information 112, determining how to handle the frame from the transport layer task context and the framing information 114, generating a DMA descriptor 116, and storing an updated transport layer task context 118. The transport layer task context may be read from and stored to a transport layer task context memory. The transport layer task context memory may be used exclusively in performing the transport layer task. One or more of the operations of the transport layer task 110 may be performed in parallel or in a pipelined fashion rather than in the sequential fashion illustrated by FIG. 6B.

FIG. 6C is a flowchart for performing a direct memory access (DMA) task 120. The DMA task includes reading a DMA task context 122, transferring a previously stored second information unit to a destination memory by processing a previously generated second DMA descriptor 124, and storing an updated DMA task context 126. The DMA task context may be read from and stored to a DMA task context memory. The DMA task context memory is used exclusively in performing the DMA task. One or more of the operations of the DMA layer task 120 may be performed in parallel or in a pipelined fashion rather than in the sequential fashion illustrated by FIG. 6C.

The DMA task 120 can be performed concurrently with the transport layer task 110 with the DMA task operating on an information unit that was previously stored by the frame parsing task 100 and using a DMA descriptor that was previously generated by the transport layer task. The resulting parallelism of the data handling may result in a reduced need to stall the transfer of data to the frame based data transfer device, particularly when a number of frames with small information units are received in succession. It will be appreciated that the exemplary tasks described may be further processed in parallel to further reduce the net processing time for a data frame. In one embodiment the frame parsing task 100 and the transport layer task 110 are performed alternately in sequence and the DMA task 120 is performed in parallel to that combination of tasks. The transport layer task context memory and the DMA task context memory may be accessed concurrently to further the parallel performance of the transport layer task and the DMA task.

FIG. 7 is a chart that illustrates an exemplary timing of data transfers using an embodiment of the invention. The receipt of three frames designated as A, B, and C in close succession is illustrated. The first frame, A, is received and parsed by frame parsing task 100A. Frame parsing may be a relatively simple and fast operation that can be accomplished at or near the data transfer rate of the link layer interface. For example, parsing the exemplary frame shown in FIG. 3 may include verifying the correctness of the frame by computing a cyclic redundancy check (CRC) for the received frame and comparing to the CRC value provided in the frame. Parsing may further include extracting the included information, such as data lengths and addresses, and making that information available for the data transfer processes. The following frames are parsed as they are received 100B, 100C.

As soon as Frame A is parsed 100A, the transport layer task 110A for that frame can begin. The transport layer task may be a more time-consuming task that may take longer than the transmission time for frames with small information units. In the example timing illustrated, the parsing of Frame B 100B finishes before transport layer task for Frame A 110A. Thus there is a delay between the time when the parsing of Frame B 100B finishes and the transport layer task for Frame B 110B begins. The exemplary timing shown also shows a delay between the time when the parsing of Frame C 100C finishes and the transport layer task for Frame C 110C begins. As shown, the time required for the transport layer task may be relatively uniform for all frames regardless of the size of the information unit.

As soon as the Frame A transport layer task 110A is completed, the Frame A DMA task 120A can begin. The time required for DMA task will normally vary in length depending on the size of the information unit to be transferred to the destination memory. The DMA task for a frame may begin at the later of the completion of the transport layer task for that frame or the completion of the DMA task for the preceding frame. As shown in FIG. 7, the Frame B DMA task 120B does not begin when the Frame B transport layer task 110B is completed because it has to wait until the Frame A DMA task 120A is completed. On the other hand, the Frame C DMA task 120C cannot begin when the Frame B DMA task 120B is completed because it has to wait until the Frame C transport layer task 110C is completed.

While certain exemplary embodiments have been described and shown in the accompanying drawings, it is to be understood that such embodiments are merely illustrative of and not restrictive on the broad invention. For example embodiments of the invention may be used with a variety of frame based data transfer protocols including but not limited to Serial SCSI Protocol (SSP) used to communicate with SAS SCSI targets, SATA Tunneling Protocol (STP) used to communicate with Serial ATA targets, the Serial Management Protocol (SMP) used to communicate with and manage SAS expander devices found in a SAS Domain, the Fibre Channel Protocol (FCP) used to communicate with and manage FC hubs, switches and domain controllers, and Internet SCSI (iSCSI) used to communicate with SAS SCSI targets over networks. Embodiments of this invention are not limited to the specific constructions and arrangements shown and described, since various other modifications may occur to those ordinarily skilled in the art.

What is claimed is:

1. A frame based data transfer device comprising:
   a receive frame parser to receive a frame, to store framing information from the frame in a receive header queue, and to store an information unit from the frame in an information unit buffer;
   a receive frame processor coupled to the receive header queue, the receive frame processor to perform transport layer tasks including reading a transport layer task context as determined by a tag field in the framing information, to determine how to handle the frame from the transport layer task context and the framing information, generating a DMA descriptor, and storing an updated transport layer task context; and
   a direct memory access (DMA) engine coupled to the information unit buffer and the receive frame processor, the DMA engine to perform DMA tasks including reading a DMA task context, transferring the information unit to a destination memory by processing the DMA descriptor, and storing an updated DMA task context, wherein the DMA engine performs the DMA tasks and the receive frame processor performs the transport layer tasks concurrently with one another.

2. The frame based data transfer device of claim 1, further comprising a transport layer task context memory coupled to the receive frame processor to store the transport layer task context, and a DMA task context memory coupled to the DMA engine to store the DMA task context such that the DMA engine can store the DMA task context concurrently with the receive frame processor storing the transport layer task context.

3. The frame based data transfer device of claim 2, wherein the transport layer task context memory is for the exclusive use of the receive frame processor, and the DMA task context memory is for the exclusive use of the DMA engine.

4. The frame based data transfer device of claim 2, wherein the transport layer task context memory and the DMA task context memory can be accessed concurrently.

5. The frame based data transfer device of claim 2, further comprising a task context cache controller coupled to the receive frame processor, the transport layer task context memory, the DMA engine, and the DMA task context memory, the task context cache controller to receive and process in parallel requests for the transport layer task context memory and the DMA task context memory from the receive frame processor and the DMA engine.

6. The frame based data transfer device of claim 1, wherein the receive frame parser is further to check for errors in the frame.

7. A frame based data transfer system comprising:
   a storage device with a serial attached small computer systems interface (SAS);
   a receive frame parser coupled to SAS interface, the receive frame parser to receive a frame from the storage device, to store framing information from the frame in a receive header queue, and to store an information unit from the frame in an information unit buffer;
   a receive frame processor coupled to the receive header queue, the receive frame processor to perform transport layer tasks including reading a transport layer task context as determined by a tag field in the framing information, to determine how to handle the frame from the transport layer task context and the framing information, generating a DMA descriptor, and storing an updated transport layer task context; and
   a direct memory access (DMA) engine coupled to the information unit buffer and the receive frame processor, the DMA engine to perform DMA tasks including reading a DMA task context, transferring the information unit to a destination memory by processing the DMA descriptor, and storing an updated DMA task context, wherein the DMA engine performs the DMA tasks and the receive frame processor performs the transport layer tasks concurrently with one another.

8. The frame based data transfer system of claim 7, further comprising a transport layer task context memory coupled to the receive frame processor to store the transport layer task context, and a DMA task context memory coupled to the DMA engine to store the DMA task context such that the DMA engine can store the DMA task context concurrently with the receive frame processor storing the transport layer task context.

9. The frame based data transfer system of claim 8, wherein the transport layer task context memory is for the exclusive use of the receive frame processor, and the DMA task context memory is for the exclusive use of the DMA engine.

10. The frame based data transfer system of claim 8, wherein the transport layer task context memory and the DMA task context memory can be accessed concurrently.

11. The frame based data transfer system of claim 8, further comprising a task context cache controller coupled to the receive frame processor, the transport layer task context memory, the DMA engine, and the DMA task context memory, the task context cache controller to receive and process in parallel requests for the transport layer task context memory and the DMA task context memory from the receive frame processor and the DMA engine.

12. The frame based data transfer system of claim 7, wherein the receive frame parser is farther to check for errors in the frame.

13. A method of transferring framed data comprising:
performing a frame parsing task including
receiving a frame from a link layer interface,
storing framing information from the frame in a receive header queue, and
storing an information unit from the frame in an information unit buffer;
performing a transport layer task including
reading a transport layer task context as determined by a tag field in the framing information,
determining how to handle the frame from the transport layer task context and the framing information,
generating a DMA descriptor, and
storing an updated transport layer task context; and
performing a direct memory access (DMA) task concurrently with the transport layer task, the DMA task including
reading a DMA task context,
transferring a previously stored second information unit to a destination memory by processing a previously generated second DMA descriptor, and
storing an updated DMA task context.

14. The method of transferring framed data of claim 13, wherein the transport layer task context memory is used exclusively in performing the transport layer task, and the DMA task context memory is used exclusively in performing the DMA task.

15. The method of transferring framed data of claim 13, wherein the transport layer task context memory and the DMA task context memory are accessed concurrently.

16. The method of transferring framed data of claim 13, further comprising checking for errors in the frame before performing the transport layer task.

* * * * *